UNITED STATES PATENT OFFICE.

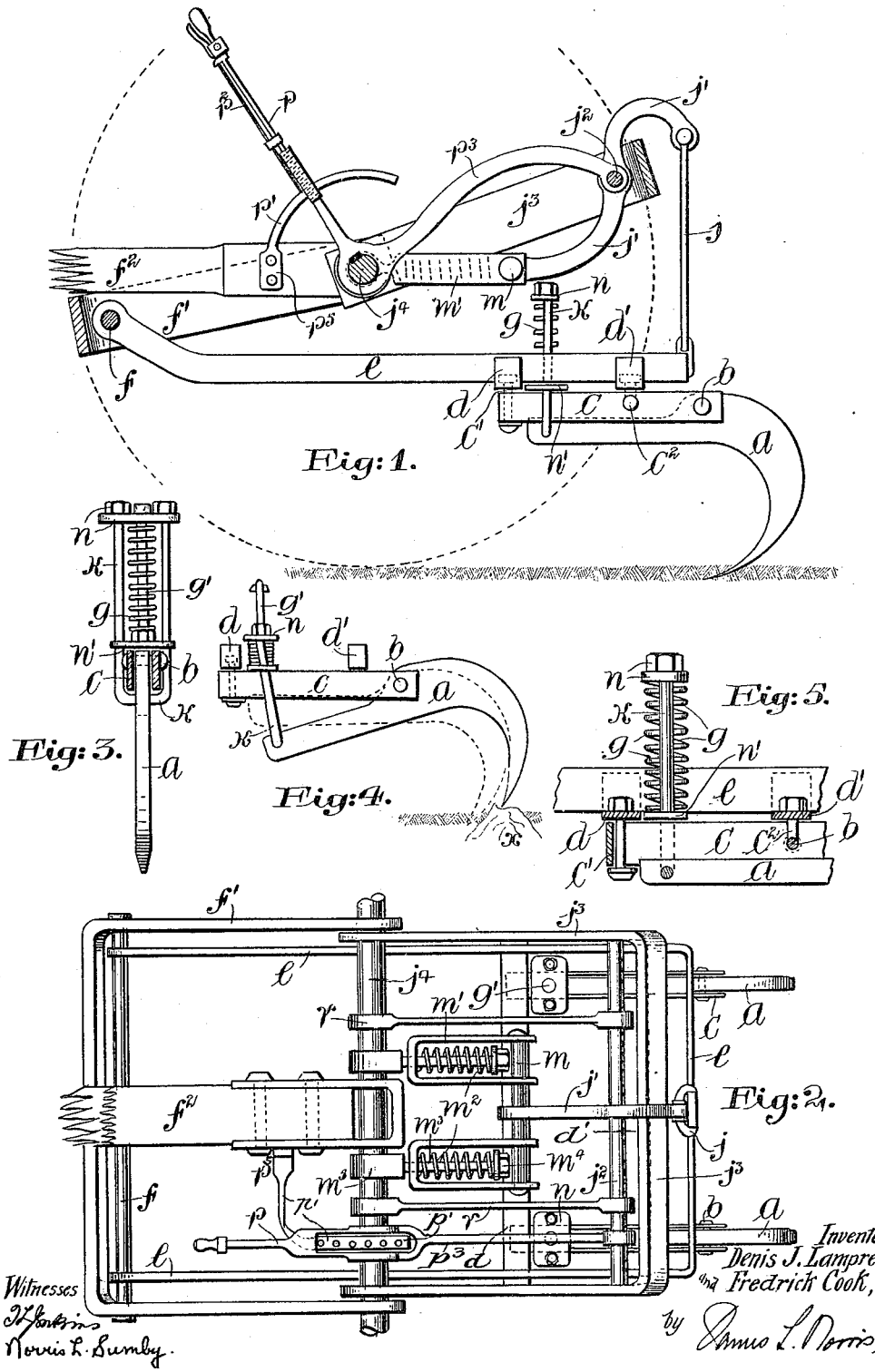

DENIS JOHN LAMPRELL AND FREDRICK COOK, OF DOWERIN, WESTERN AUSTRALIA, AUSTRALIA.

CULTIVATOR.

1,141,804. Specification of Letters Patent. Patented June 1, 1915.

Application filed September 4, 1913. Serial No. 788,169.

*To all whom it may concern:*

Be it known that we, DENIS JOHN LAMPRELL and FREDRICK COOK, both subjects of the King of Great Britain, and residing at Dowerin, Western Australia, Commonwealth of Australia, have invented certain new and useful Improvements in Cultivators, of which the following is a specification.

This invention relates to improvements in cultivators, and it embodies the use and provision of a pressure spring for each separate pivoted tine, and, also, a pressure spring or springs for each section of tines, the latter springs being employed to impart flexibility to the frame. The object of said springs is to cause or urge the tines, either separately or conjointly as a group or gang, to the working position immediately after passing over an obstacle, and, also, to urge the tines to their work and to maintain them at a uniform depth.

The invention will now be explained with the aid of the annexed drawings, in which—

Figure 1 is a side sectional elevation of the improved cultivator showing the application of one of the pressure springs to a tine and, also, to the frame carrying said tine. Fig. 2 is a plan view. Fig. 3 is a rear end view of one of the tines and its carrier bracket. Fig. 4 is a detail showing, in full lines, the passage of the tine over an obstacle, and, in dotted lines, the normal position of the tine. Fig. 5 is a detail showing the manner of securing the tine-carrier bracket to the frame.

In said figures $a$ indicates one of the tines, of which there may be any number, as will be understood. This tine is pivoted at $b$ to its carrier bracket $c$, which latter also acts as a guide to insure correct working of the tine. The said carrier bracket $c$ is U-shaped and is secured to the cross-bars $d$ and $d^1$ of the U-shaped frame $e$, the cross-bars mentioned extending across said frame and having their ends turned upward and suitably secured to the side members of said frame. The front end of said bracket $c$ is secured to the cross-bar $d$ by the bolt $c^1$, and the central portion thereof is secured to the other cross-bar $d^1$ by an inverted T-bolt $c^2$, whose head is riveted through the side cheeks of the bracket. The frame $e$, at its front end, is pivoted on the cross-bar $f$, which latter forms part of the main frame $f^1$ and is rigidly attached to the draft pole $f^2$ of the cultivator.

Each tine $a$ is provided with its own pressure spring $g$, which is suitably guided on the rod $g^1$ and operatively held in the U-shaped bridle piece K, the latter having a suitable tension adjustment device $n$, here shown as consisting of a pair of nuts and a head plate. The connecting or bottom portion of this bridle passes through the tine $a$, and its arms pass through the foot plate $n^1$, as shown clearly in Fig. 3, the tension of spring $g$ operating as between the adjustment device $n$ and the foot plate $n^1$, which latter is mounted on the carrier bracket $c$.

The front of the frame $e$ is pivoted to the cross-bar $f$, and is suspended at its rear end by the link $j$ from an arm $j^1$, said arm being pivoted on the cross-bar $j^2$ of the secondary frame $j^3$ of the cultivator. Frame $j^3$ is rigidly connected to the main axle $j^4$. Arm $j^1$, at its other end, is connected to the cross-bar $m$ carrying the bridles $m^1$ in which the spiral springs $m^2$ are tensionally held on the pins $m^3$ by the nuts $m^4$. The pins $m^3$ extend through openings in the forward ends of the bridles $m^1$ and have their heads $m^5$ hingedly connected to the axle $j^4$ of the cultivator, such connection serving to impart rigidity and firmness of action to the bridles and their contained tension springs $m^2$. These springs $m^2$ act to exert pressure upon the frame as a whole, in the same way as the springs $g$ upon the tines.

When the tine meets an obstacle $x$, as seen in Fig. 4, its rear portion is forced to rock upward on its pivot $b$ toward the stay bar $d^1$ of the frame $e$, while the downward movement of its front end contracts the spring $g$.

The pressure springs $m^2$ of the frame, as also the springs $g$ of the tines, are set to the approved normal working tension by means of the nuts $m^4$ and the adjustment devices $n$, respectively, and the said springs $m^2$ are also controlled as a whole by the single lever $p$, which is keyed on the axle $j^4$ and retained in any position by the usual notched quadrant $p^1$ and pawl $p^2$, the quadrant being rigidly secured at $p^5$ to the draft pole $f^2$. The lever $p$, by its arm $p^3$, is operatively connected to the cross-bar $j^2$ carrying the arm $j^1$, whereby said arm $j^1$ and connected members and parts are operated. This lever $p$, while controlling all the tines of the cultivator together, allows each tine independence of action, and it also sets the depth of cut for the tines by pressing frame $e$ downward by means of the arm $j^1$ and link $j$, while each separate tine is kept to its work by its spring $g$. Each tine is controlled by its own spring $g$, and if such spring prove insufficient to allow the tine to rise and pass over the obstacle, then the springs $m^2$ respond to the pressure and allow the whole frame $e$ to rise sufficiently high to clear said obstacle. Any number of strengthening bars $r^1$ may be used, these bars being keyed to the axle $j^4$ and also to the cross-bar $j^2$. They act and move in unison with the lever $p$ and are auxiliary to the frame $j^3$.

We claim:—

1. In a cultivator, the combination of a frame provided with a cross-bar; a horizontal guide bracket rigidly secured to said bar; a tine pivoted intermediate its ends to said bracket; and a pressure spring for normally holding the front end of said tine in raised position.

2. In a wheeled cultivator, the combination of a cultivator frame; an axle to which said frame is connected; a rearwardly-extending arm carried by said axle; a second frame pivotally connected at its front end to said cultivator frame and suspended at its rear end from said arm; and resilient devices for normally holding said second frame in lowered position.

3. In a wheeled cultivator, the combination of a cultivator frame; an axle to which said frame is connected; a longitudinally-arranged arm fulcrumed intermediate its ends in the cultivator frame; a second frame pivotally connected at its front end to the cultivator frame and suspended at its rear end from the rear end of said arm; and resilient means connected to the front end of said arm for normally holding said second frame in lowered position.

4. In a wheeled cultivator, the combination of a cultivator frame; an axle to which said frame is connected; a rearwardly-extending arm carried by said axle; a longitudinally-arranged arm pivotally connected intermediate its ends to the rear end of the first-named arm; a link suspended from the rear end of the second-named arm; a second frame pivotally connected at its front end to the cultivator frame and having its rear end connected to said link; and resilient connections between said axle and the front end of the second-named arm for normally holding said second frame in lowered position.

In testimony whereof we have hereunto set our hands in presence of two subscribing witnesses.

DENIS JOHN LAMPRELL.
FREDRICK COOK.

Witnesses:
JOHN McPHERSON,
R. H. LEESON.

Copies of this patent may be obtained for five cents each, by addressing the "Commissioner of Patents, Washington, D. C."